United States Patent [19]

Wall

[11] Patent Number: 5,536,554
[45] Date of Patent: Jul. 16, 1996

[54] REINFORCING FABRIC FOR POWER TRANSMISSION BELTS

[75] Inventor: Donald T. Wall, Valley, Ala.

[73] Assignee: Wellington Sears Company, Valley, Ala.

[21] Appl. No.: 308,723

[22] Filed: Sep. 19, 1994

[51] Int. Cl.⁶ .............................. B32B 5/12; B32B 7/00; F16G 1/00; F16G 1/04
[52] U.S. Cl. ................ 428/113; 428/257; 428/259; 474/261; 474/262; 474/266; 474/267
[58] Field of Search ..................... 428/113, 257, 428/259; 474/261, 262, 266, 267

[56] References Cited

U.S. PATENT DOCUMENTS

| | | | |
|---|---|---|---|
| 2,709,475 | 5/1955 | Steckel et al. | 154/1 |
| 3,446,251 | 5/1969 | Dow | 420/257 |
| 3,784,427 | 1/1974 | Griffin | 156/139 |
| 4,055,697 | 10/1977 | Schmanski | 428/113 |
| 4,062,989 | 12/1977 | Long | 427/176 |
| 4,169,393 | 10/1979 | Wetzel et al. | 139/383 R |
| 4,622,243 | 11/1986 | Long | 427/176 |
| 4,845,963 | 7/1989 | Parekh | 66/170 |
| 4,906,506 | 3/1990 | Nishimura et al. | 428/113 |
| 5,068,000 | 11/1991 | Lauderdale | 156/148 |

*Primary Examiner*—James D. Withers
*Attorney, Agent, or Firm*—Kirkpatrick & Lockhart

[57] ABSTRACT

A reinforcing fabric for reinforcing power transmission belts is comprised of a first fibrous web having minimal warp yarns and filler yarns oriented at a desired right lead. A second fibrous web is provided which has minimal warp yarns and filler yarns oriented at a desired left lead. The first and second fibrous webs are interconnected either mechanically, chemically, or both, so that an angle of between 178° and 60° is formed between the filler yarns of the first fibrous web and the filler yarns of the second fibrous web when viewed in the direction of tension on the power transmission belt. The resulting reinforcing fabric may be formed in the belt direction so that banner cutting is eliminated. This makes it possible to make an endless belt with only one splice.

3 Claims, 2 Drawing Sheets

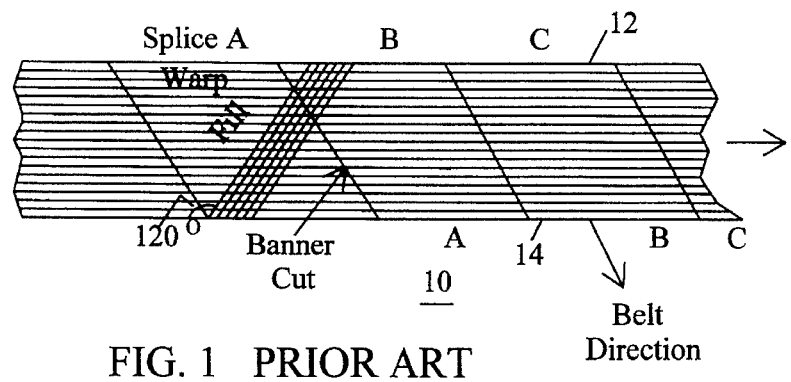
FIG. 1  PRIOR ART
FIG. 2  PRIOR ART
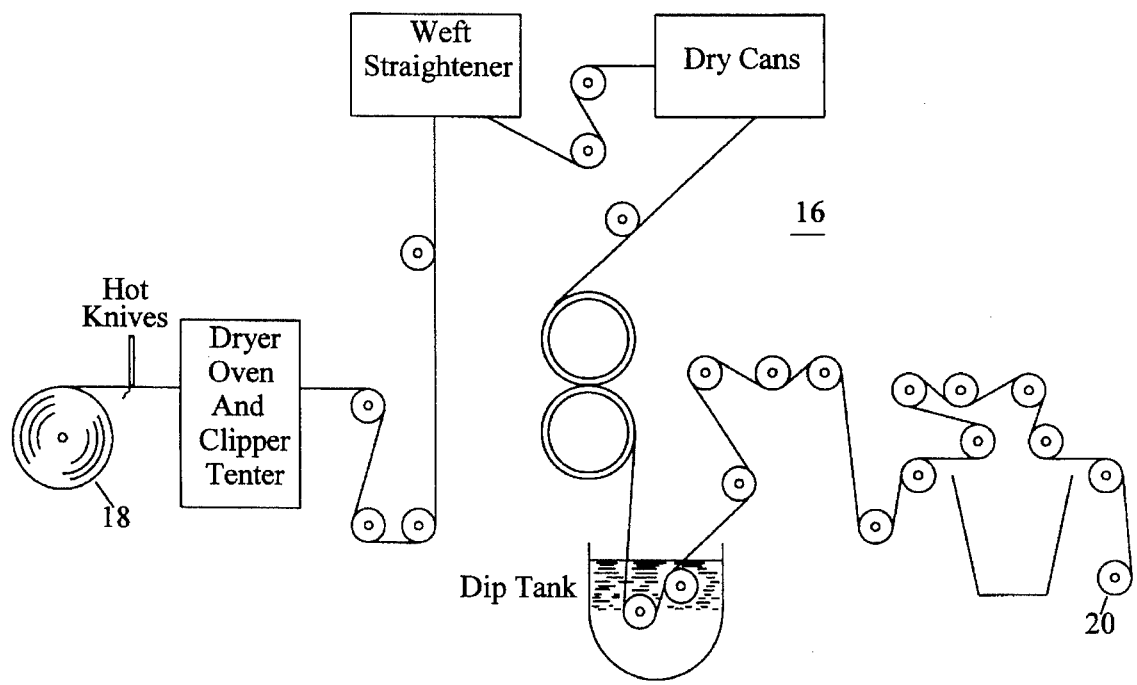

REINFORCING FABRIC FOR POWER TRANSMISSION BELTS

BACKGROUND OF THE INVENTION

The present invention is directed to a reinforcing material employed in the production of industrial products such as power transmission belts and the like and a method of producing such a reinforcing material.

FIELD OF THE INVENTION

In connection with the manufacture of endless power transmission belts, such a V-belts, gear belts, and the like, it is conventional to utilize a construction of fabric reinforced rubber or other elastomer. Typically, the belt structure includes a cord winding layer, which is located along the "neutral" axis of the belt. Cross-sectional areas of such belts above and below the neutral axis are subject to flexing in tension and/or compression. In a typical endless belt, for example, outer portions of the belt cross-section are flexed in tension, as the belt passes around the sheaves over which it is trained. The inner cross-sectional portions of the belt are subjected to flexing in compression. For some installations, a single belt may be required to pass over both internal and external sheaves, such that both the inner and outer cross-sectional portions thereof are flexed in both tension and compression.

In a transmission belt of conventional construction, it is a known practice to incorporate as a protective cover and/or reinforcement, a bias-cut woven textile fabric, e.g., a woven fabric having its warp and weft threads disposed at an angle to its longitudinal axis, which may have been previously coated and impregnated with an uncured, tacky, elastomeric compound, such as a synthetic rubber. It has been customary to utilize bias-type fabric for the reinforcing material, so that the yarns of the fabric do not extend parallel to the longitudinal axis of the belt, but rather are arranged at angles thereto. By incorporating such strips of reinforcing fabric into the elastomeric material of the belt, either in the inner, outer, or both cross-sectional areas of the belt, stability is imparted to the belt's geometry.

Pursuant to prior practice, the manufacture of bias-type reinforcing fabric has been extremely labor intensive, and therefore costly, and at the same time less than optimally effective for the purpose. In one commonly used procedure, for example, tubular woven fabric is slit along a spiral at an angle of about 15° to the longitudinal axis of the fabric tube. The continuous strip resulting from the bias slitting of the tube has its yarns disposed asymmetrically with respect to the longitudinal axis of the fabric strip. The slit fabric strip is thereafter elongated to reorient the yarns, in an effort to align them approximately at a relative angle of about 120°. The length of slit fabric is impregnated with uncured elastomeric material and then banner cut into short sections, at an angle of about 60° to the axis of the warp yarns in the slit fabric. The banner cutting results in a series of rhomboid-shaped sections. Those are rotated 90° and then spliced by overlapping. That results in a spliced length of material in which the yarns are arranged at an angle of around 120° symmetrical to the longitudinal axis of the spliced length. That assembled length is later slit into narrower strips, appropriate to the desired end use.

Because of crowding of the yarns at the edge extremities of the tubular woven material, a continuous length of the bias cut fabric has periodic diagonal non-uniformities. If allowed to remain in the fabric, these can result in undesirable puckering, bagging or wrinkling. Accordingly, it is sometimes necessary to cut away and discard such sections before banner cutting.

An improvement over the aforementioned process is disclosed in U.S. Pat. No. 5,068,000 entitled Method Of Making A Reinforcing Fabric For Power Transmission Belts, Hoses, And The Like. According to the process disclosed in that patent, the reinforcing fabric is not woven in tubular form, but is woven in flat form, advantageously on a high speed shuttleless machine. The woven starting material is more or less conventional in form, advantageously being of a poly-cotton composition. The particular yarn composition and fabric makeup can be varied to suit the requirements of the end user. The conventionally flat woven fabric 10, shown in FIG. 1, is further processed pursuant to the invention of the aforementioned patent to impart thereto a significant bias construction. That is, the weft yarns are caused to be disposed at a substantial angle to the longitudinally extending warp yarns as seen in FIG. 1. It is also seen from FIG. 1, when viewed from the perspective of the belt direction, that an angle of approximately 120° exists between the warp yarns and the weft yarns. By belt direction, it is meant that when a final commercial product is produced, the tension which is placed on the belt will be in the direction of the belt direction. Thus it is seen in FIG. 1 that the desired 120° between the weft yarn and the warp yarn is achieved when viewed in the belt direction.

However, as also can be seen from FIG. 1, the belt direction is at a substantial angle with respect to the weaving direction. As a result of that, the width of the material (the distance between top edge 12 lower edge 14) is limited. In typical processes, the width of the material 10 may be approximately 60 inches before skewing and approximately 54 inches after skewing. Thus, if the belt manufacturer is constructing a belt less than 54 inches, the material 10 will be of sufficient length. However, if a belt of greater than 54 inches is required, then it is necessary to cut and splice the material 10 to provide a reinforcement fabric of sufficient length. As is known in the art, banner cuts as illustrated in FIG. 1 are typically employed. After banner cutting, the A portion of edge 14 is connected to the A portion of edge 12, the B portion of edge 14 is connected to the B portion of edge 12, etc. to construct a material of sufficient length having the desired characteristics along its entire length. However, at each splice, there is an irregularity in the fabric which causes an interruption in the smooth operation of the transmission belt. Accordingly, it is desirable to construct a material for reinforcing power transmission belts which eliminates the need for all splices, except the single splice needed to make an endless belt.

SUMMARY OF THE INVENTION

The present invention is directed to a fibrous web fabric for reinforcing power transmission belts and a method of producing such a fabric. The reinforcing fabric is comprised of a first fibrous web having minimal warp yarns. The filler material is oriented at a desired right lead. A second fibrous web is provided which has minimal warp yarns. The filler material is oriented at a desired left lead. The first and second fibrous webs are interconnected either mechanically, chemically, or both, so that an angle of between 178° and 60° is formed between the filler material of the first fibrous web and the filler material of the second fibrous web when viewed in the direction of tension on the power transmission belt.

The advantage of such a fibrous web reinforcing material is that the direction of weaving and the belt direction are the same. Thus, there are no longer any length constraints with respect to the final product. Banner cutting is completely eliminated, and the only joint which is necessary is the one joint which is required to form an endless belt. Furthermore, there is no need to trim the edges of the material inasmuch as the edges are irrelevant because the belt direction is the same as the weave direction. Those and other advantages and benefits of the present invention will become apparent from the detailed description of the preferred embodiment hereinbelow.

BRIEF DESCRIPTION OF THE DRAWINGS

For the present invention to be clearly understood and readily practiced, the present invention will be described in conjunction with the following figures wherein:

FIG. 1 illustrates a piece of reinforcing fabric constructed according to the teachings of the prior art;

FIG. 2 illustrates a prior art apparatus which may be used to produce the fibrous webs employed to produced the reinforcing fabric of the present invention;

DETAILED DESCRIPTION OF THE PREFERRED EMBODIMENTS

The fibrous webs used to produce the reinforcing material of the present invention may be constructed on a prior art machine or process line 16 of the type illustrated in FIG. 2. The machine illustrated in FIG. 2 is described in detail in U.S. Pat. No. 5,068,000, which is hereby incorporated by reference. The reader desiring additional details regarding the construction and operation of the machine 16 is directed to the aforementioned patent.

The starting material 18 for the machine 16 may have a fiber content, weight, and yarn size selected to meet the specific requirements of a particular end use. For example, the fiber content may vary from 100% cotton to 100% polyester with blends therebetween. One often used fabric construction, particularly in belt manufacture, is an 8-ounce, 50% cotton-50% polyester fabric. Another common blend for transmission belts is a 75% cotton-25% nylon blend.

The particular construction of the starting material 18 may also be varied according to the specifications of the end user. It is anticipated that the starting material 18 may be produced by weaving, knitting, carding, or Liba weft insertion. A significant difference in the starting material 18 of the present invention over the starting material of the prior art, is that the number of warp yarns are to be minimized. In fact, because the warp yarn serves no purpose in the final product, only the minimum number of warp yarns necessary to hold the starting material together are required. For example, in a prior art starting material, it is not unusual to have 35 ends per inch in the warp. With respect to the starting material 18 of the present invention, it is anticipated that approximately eight ends per inch are all that are necessary in the warp. The weft yarns, or filler, are laid at a predetermined angle with respect to the warp yarns. The determination of that angle will be discussed in greater detail below. It is anticipated that filler may be provided at a range of 10 to 60 ends per inch, with 30 ends per inch being typical.

Figure 3:
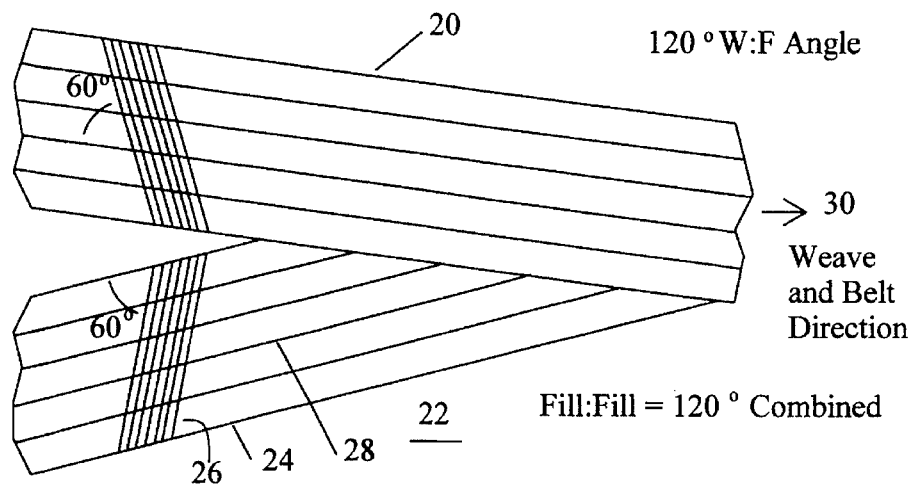
FIG. 3 illustrates a piece of reinforcing fabric constructed according to the teachings of the present invention.

After the starting material 18 has gone through the prior art process illustrated in FIG. 2, a fibrous web 20 results which is illustrated in FIG. 3. The fibrous web 20 has a greatly reduced warp count with respect to the prior art material 10. To produce a web fabric 22 according to the teachings of the present invention, a second fibrous web 24 is connected to the first fibrous web 20 through either mechanical bonding, chemical bonding, or both. Significantly, however, it is seen from FIG. 3 that the angle between the filler 26 and the warp yarns 28 of the fibrous web 24 is opposite of that of the fibrous web 20. For example, if the fibrous web 20 is a right lead, the fibrous web 24 should be a left lead. Those of skill in the art will recognize that it is possible to simply take a length of fibrous web 20, reverse it 180°, and then attach it to another length of fibrous web 20 as illustrated in FIG. 3. Under such conditions, if the angle between the filler and warp yarns of each fibrous web is 60°, the angle between the filler of one fibrous web and the filler of the other fibrous web will be 120° in the direction of the belt, which is also the direction of weaving as shown in FIG. 3 by the arrow 30.

The angle of the filler of one web with respect to the filler of the other web can be varied greatly from between 178°–60°, and more typically between 110°–125°. Calculation of the angle of the filler with respect to the warp yarns for each fibrous web is achieved by first determining the desired angle between the two fillers in the final reinforcing fabric 22 and working backwards to determine how much of the desired angle will be provided by the first fibrous web and how much of the angle must be provided by the filler of the second fibrous web. Of course, the easiest way to accomplish that is to simply divide the desired angle by two so that one fibrous web can be made, cut to length, reversed, and bonded to a length of the same fibrous web.

With a reinforcing fabric 22 constructed according to the teachings of the present invention, it is seen that the filler yarns of the fibrous webs 20 and 24 provide the necessary strength such that the warp yarns become insignificant. In certain situations, it may be desirable to make the warp yarns of a material, such as polyethylene, which will melt at a temperature below the temperatures of subsequent processing steps so that no warp yarns are apparent in the final product. Because the desired angle between the two filler yarns can be achieved such that the direction of the belt is the same as the direction of weave, it is possible to construct a reinforcing fabric 22 of any length which the final manufacturer desires. Hence, banner cutting and the joints resulting therefrom are eliminated. The only joint remaining in the final product is the single joint required to join an endless belt. That represents a substantial advance over the art, particularly in the manufacture of longer belts. Additionally, edge trimming is eliminated as the edge of the reinforcing fabric is no longer of any significance.

Of course, once the reinforcing fabric 22 has been produced, it may be subjected to any number of known processing steps to prepare it for use by the belt manufacturer.

Figure 4:
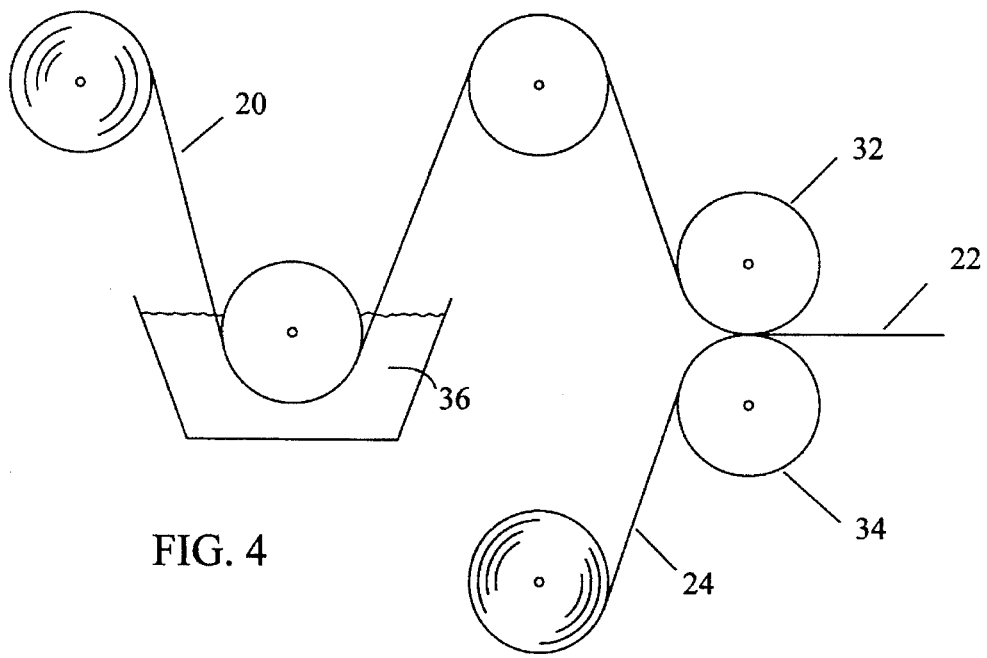
FIG. 4 illustrates a machine used to bond two fibrous webs together.

As previously mentioned, the fibrous webs 20 and 24 may be combined in any commercially feasible way consistent with the final product into which it is being manufactured. For example, as illustrated in FIG. 4, one-half a roll, i.e., a roll of one-half width, of fibrous web 20 may be coated with an adhesive 36 which is then combined by rollers 32 and 34 with the uncoated half roll 24 which has been appropriately oriented for the desired combined angle between the fillers. Various types of glues, rubber cements, and other adhesives may be used to cause the two webs to adhere to one another. Additionally, mechanical connection such as that obtained through a mechanical process could also be employed.

A sample of the web 22 was prepared according to the following specifics.

Warp yarn material—150 denier, 2 ply polyester
Filler yarn material—9's single poly cotton
Warp yarn ends per inch—8
Filler yarn ends per inch—20
Angle between filler yarns and warp yarns—60°
Starting material construction technique—weft insertion
Connection technique—adhesive (lamination)

The resulting fabric 22 had a fill fiber to fill fiber angle of 120° when viewed in the belt/weave direction.

The present invention is also directed to a method of producing the aforementioned reinforcing fabric, which method is comprised of the following steps:

forming a first fibrous web having minimal warp yarns and filler material oriented at a desired right lead;

forming a second fibrous web having minimal warp yarns and filler material oriented at a desired left lead;

interconnecting the first and second fibrous webs so that an angle of between 178° and 60° is formed between the filler material of the first fibrous web and the filler material of the second fibrous web when viewed in the direction of tension on the power transmission belt.

The present invention represents a substantial advance over the art. The reinforcing fabric 22 is "belt ready" for building cut-edge laminate, envelope-wrapped V-belts, etc. No labor intensive banner cutting and edge splicing operations are needed. The resulting belts are smoother running thereby allowing for more energy efficient power transmission. It is anticipated that the present invention may be modified by those of ordinary skill in the art. All such modifications and variations are intended to be covered by the foregoing description and the following claims.

What I claimed is:

1. A reinforcing fabric for reinforcing power transmission belts, comprising:

a first fibrous web having warp yarns with filler material oriented at a desired right or left lead;

a second fibrous web having warp yarns with filler material oriented at a desired lead opposite to the lead of the first fibrous web, said warp yarns being present in said first and second fibrous webs in a quantity no greater than a quantity sufficient to support the filler material during processing; and means for interconnecting said first and second fibrous webs so that an angle of between 178° and 60° is formed between said filler material of said first fibrous web and said filler material of said second fibrous web when viewed in the direction of tension on the power transmission belt.

2. The fabric of claim 1 wherein the angle is between 110° and 125°.

3. The fabric of claim 1 wherein the warp yarns are comprised of a material that melts at temperatures below the temperatures of subsequent processing steps.

* * * * *